(12) United States Patent
Sugiura et al.

(10) Patent No.: US 10,486,279 B2
(45) Date of Patent: Nov. 26, 2019

(54) ABNORMALITY DETERMINATION DEVICE AND ABNORMALITY DETERMINING METHOD

(71) Applicant: FANUC CORPORATION, Yamanashi (JP)

(72) Inventors: Fuyuki Sugiura, Yamanashi-ken (JP); Motohiro Nagaya, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 6 days.

(21) Appl. No.: 15/844,699

(22) Filed: Dec. 18, 2017

(65) Prior Publication Data

US 2018/0169814 A1 Jun. 21, 2018

(30) Foreign Application Priority Data

Dec. 20, 2016 (JP) .................. 2016-246797

(51) Int. Cl.
| | | |
|---|---|---|
| *B23Q 17/09* | (2006.01) | |
| *H02P 6/28* | (2016.01) | |
| *G05B 19/19* | (2006.01) | |
| *H02P 6/16* | (2016.01) | |
| *H02P 6/17* | (2016.01) | |
| *G05B 19/406* | (2006.01) | |
| *H02P 29/024* | (2016.01) | |
| *H02P 5/46* | (2006.01) | |

(52) U.S. Cl.
CPC ......... *B23Q 17/0961* (2013.01); *G05B 19/19* (2013.01); *G05B 19/406* (2013.01);
(Continued)

(58) Field of Classification Search
CPC ............... B23Q 17/0961; G05B 19/19; G05B 2219/45244; H02P 5/46; H02P 6/28
See application file for complete search history.

(56) References Cited

U.S. PATENT DOCUMENTS

| | | | |
|---|---|---|---|
| 6,112,156 A | 8/2000 | Kang | |
| 6,545,836 B1 * | 4/2003 | Ioannou | ............... G05B 13/026 360/77.06 |
| 7,173,393 B2 * | 2/2007 | Maeda | ............. H02M 7/53873 318/400.02 |

FOREIGN PATENT DOCUMENTS

| | | |
|---|---|---|
| CN | 1442336 A | 9/2003 |
| CN | 101782468 A | 7/2010 |

(Continued)

OTHER PUBLICATIONS

Untranslated Decision to Grant a Patent mailed by Japan Patent Office (JPO) for Application No. JP 2016-246797, dated Aug. 7, 2018, 3 pages.

(Continued)

*Primary Examiner* — Elias Desta
(74) *Attorney, Agent, or Firm* — Fredrikson & Byron, P.A.

(57) ABSTRACT

An abnormality determination device includes: an oscillating signal sending unit configured to send out an oscillating signal which causes a rotary shaft of a servomotor to rotate and swing in a predetermined pattern, to a motor control unit configured to control the servomotor; a measuring unit configured to measure a physical quantity representing the state of the servomotor when the rotary shaft of the servomotor is swung; a comparing unit configured to compare a measurement signal of the measured physical quantity with a reference signal; and an abnormality determination unit configured to determine occurrence of an abnormality in a drive system which includes the servomotor and the motor control unit and ranges from a driven object to be driven by the servomotor to the motor control unit, based on comparison result from the comparing unit.

16 Claims, 12 Drawing Sheets

(52) U.S. Cl.
CPC .............. *H02P 6/16* (2013.01); *H02P 6/17* (2016.02); *H02P 6/28* (2016.02); *H02P 29/0241* (2016.02); *G05B 2219/41001* (2013.01); *G05B 2219/45244* (2013.01); *H02P 5/46* (2013.01)

(56) References Cited

FOREIGN PATENT DOCUMENTS

| | | | |
|---|---|---|---|
| CN | 101821938 A | 9/2010 | |
| CN | 102027670 A | 4/2011 | |
| CN | 105262607 A | 1/2016 | |
| DE | 102005024385 A1 | 11/2006 | |
| JP | 6046799 A | 3/1985 | |
| JP | 1084688 A | 3/1998 | |
| JP | 1190884 A | 4/1999 | |
| JP | 1195820 A | 4/1999 | |
| JP | 2000236685 A | 8/2000 | |
| JP | 2009159750 A | 7/2009 | |

OTHER PUBLICATIONS

English machine translation of Decision to Grant a Patent mailed by Japan Patent Office (JPO) for Application No. JP 2016-246797, dated Aug. 7, 2018, 3 pages.

Untranslated Notification of Reasons for Refusal mailed by Japan Patent Office (JPO) for Application No. JP 2016-246797, dated May 15, 2018, 3 pages.

Translated Notification of Reasons for Refusal mailed by Japan Patent Office (JPO) for Application No. JP 2016-246797, dated May 15, 2018, 3 pages.

English Abstract and Machine Translation for Japanese Publication No. 2009-159750 A, published Jul. 16, 2009, 11 pgs.

English Abstract and Machine Translation for Japanese Publication No. 11-095820 A, published Apr. 9, 1999, 8 pgs.

English Abstract for Japanese Publication No. JPH1084688 A, published Mar. 31, 1998, 1 pg.

English Abstract and Machine Translation for Japanese Publication No. 2000-236685 A, published Aug. 29, 2000, 6 pgs.

English Abstract and Machine Translation for Japanese Publication No. 60-046799 A, published Mar. 13, 1985, 6 pgs.

English Abstract and Machine Translation for Japanese Publication No. 11-090884 A, published Apr. 6, 1999, 7 pgs.

English Abstract and Machine Translation for Chinese Publication No. 105262607 A, published Jan. 20, 2016, 18 pgs.

English Abstract and Machine Translation for Chinese Publication No. 1442336 A, published Sep. 17, 2003, 23 pgs.

English Abstract and Machine Translation for Chinese Publication No. 102027670 A, published Apr. 20, 2011, 47 pgs.

English Abstract and Machine Translation for Chinese Publication No. 101782468 A, published Jul. 21, 2010, 35 pgs.

English Abstract and Machine Translation for Chinese Publication No. 101821938 A, published Sep. 1, 2010, 23 pgs.

English Machine Translation for German Publication No. 102005024385 A1, published Nov. 30, 2006, 17 pgs.

\* cited by examiner

ABNORMALITY DETERMINATION DEVICE AND ABNORMALITY DETERMINING METHOD

CROSS-REFERENCE TO RELATED APPLICATION

This application is based upon and claims the benefit of priority from Japanese Patent Application No. 2016-246797 filed on Dec. 20, 2016, the contents of which are incorporated herein by reference.

BACKGROUND OF THE INVENTION

Field of the Invention:
The present invention relates to an abnormality determination device and an abnormality determining method for determining abnormality of a drive system including a servomotor and the like.

Description of the Related Art:
Japanese Laid-Open Patent Publication No. 11-095820 discloses a machine tool equipped with an operation recording function, which measures electric currents supplied to a spindle motor and a rotary tool motor as load data, displays a warning when the measured current exceeds a warning threshold and stores the measured current as load data. It is also disclosed that when the measured current exceeds an abnormality threshold, the machine tool displays occurrence of an abnormality, quickly retracts the rotary tool base from the workpiece and stores the measured current as load data.

SUMMARY OF THE INVENTION

However, in the above Japanese Laid-Open Patent Publication No. 11-095820, since only the abnormality of the motor is detected based on the current value of the motor and the threshold value, it is impossible to detect the abnormality of the drive system including the motor. For example, it is impossible to detect an abnormality resulting from a loosen bolt in the drive system and the like.

It is therefore an object of the present invention to provide an abnormality determination device and an abnormality determining method capable of detecting abnormality in a drive system including a motor.

According to a first aspect of the present invention, there is provided an abnormality determination device including: an oscillating signal sending unit configured to send out an oscillating signal which causes a rotary shaft of a servomotor to rotate and swing in a predetermined pattern, to a motor control unit configured to control the servomotor; a measuring unit configured to measure a physical quantity representing the state of the servomotor when the rotary shaft is swung; a comparing unit configured to compare a measurement signal of the measured physical quantity with a reference signal; and an abnormality determination unit configured to determine occurrence of an abnormality in a drive system which includes the servomotor and the motor control unit and ranges from a driven object to be driven by the servomotor to the motor control unit, based on the comparison result from the comparing unit.

According to a second aspect of the present invention, there is provided an abnormality determining method including: a sending step of sending out an oscillating signal which causes a rotary shaft of a servomotor to rotate and swing in a predetermined pattern, to a motor control unit configured to control the servomotor; a measuring step of measuring a physical quantity representing the state of the servomotor when the rotary shaft is swung; a comparing step of comparing a measurement signal of the measured physical quantity with a reference signal; and a determining step of determining occurrence of an abnormality in a drive system which includes the servomotor and the motor control unit and ranges from a driven object to be driven by the servomotor to the motor control unit, based on a comparison result in the comparing step.

According to the present invention, it is possible to detect abnormality in a drive system including a servomotor.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An abnormality determination device and an abnormality determining method according to the present invention will be detailed hereinbelow by describing preferred embodiments with reference to the accompanying drawings.

[First Embodiment]

Figure 1:
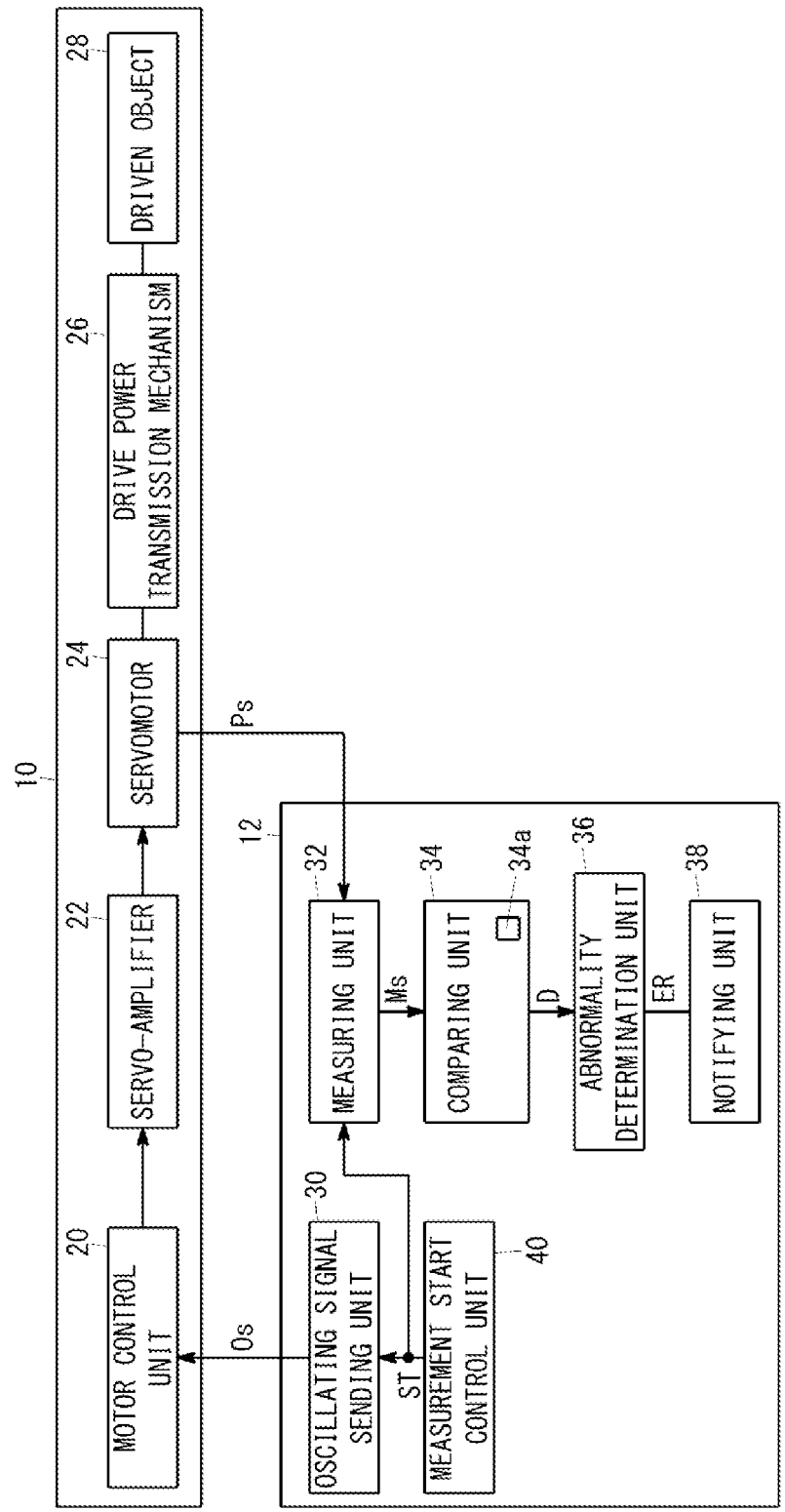
FIG. 1 is a diagram showing an abnormality determination system including a drive system and an abnormality determination device for determining abnormality of the drive system, according to a first embodiment.

FIG. 1 is a diagram showing an abnormality determination system 14 having a drive system 10 and an abnormality determination device 12 for determining abnormality of the drive system 10. The drive system 10 is installed in a robot or a processing machine (such as a machine tool or an injection molding machine). For example, in the case of a machine tool, the drive system 10 is a drive system for axially moving a driven object 28 such as a table, a tool or the like. In the case of an injection molding machine, the drive system 10 is a drive system for rotating the injection screw as a driven object 28 and/or moving it forward and backward. In the case of a robot, the drive system 10 is a mechanism for bending an arm as a driven object 28 at a joint or turning the arm.

The drive system 10 includes a motor control unit 20, a servo-amplifier 22, a servomotor 24, a drive power transmission mechanism 26 and a driven object 28. That is, the drive system 10 is composed of various mechanisms, members, parts and others ranging from the driven object 28 to the motor control unit 20.

The servo-amplifier 22 drives the servomotor 24, and the motor control unit 20 controls the servo-amplifier 22 to thereby control rotation of the servomotor 24.

The drive power transmission mechanism 26 transmits the driving force (rotational force) of the servomotor 24 to the driven object 28 to thereby drive the driven object 28. The drive power transmission mechanism 26 may convert the rotational force of the servomotor 24 into a linear motion and transmit it to the driven object 28 or may directly transmit the rotational force of the servomotor 24 to the driven object 28. Therefore, the drive power transmission mechanism 26 may include any one of a ball screw, a gear, and a pulley.

The abnormality determination device 12 includes an oscillating signal sending unit 30, a measuring unit 32, a comparing unit 34, an abnormality determination unit 36, a notifying unit 38 and a measurement start control unit 40. The abnormality determination device 12 includes at least a processor such as a CPU, and a storage medium storing therein a program for abnormality determination. The processor executes the program for abnormality determination to thereby function as the abnormality determination device 12 of the first embodiment.

The oscillating signal sending unit 30 sends to the motor control unit 20 an oscillating signal Os for causing the rotary shaft of the servomotor 24 to rotate and swing (rotate back and forth) in a predetermined pattern. The oscillating signal Os is a signal with its signal value periodically changing. Here, the oscillating signal Os is a command signal that controls the motor control unit 20 so as to cause the rotary shaft of the servomotor 24 to rotate a predetermined angle in the forward direction and then rotate a predetermined angle in the reverse direction in a repeated manner with the current rotary position of the rotary shaft (which will be hereinbelow referred to as a reference position) as a reference. The value of the oscillating signal Os indicates a command position (command rotational position) of the rotary shaft of the servomotor 24.

Figure 2:
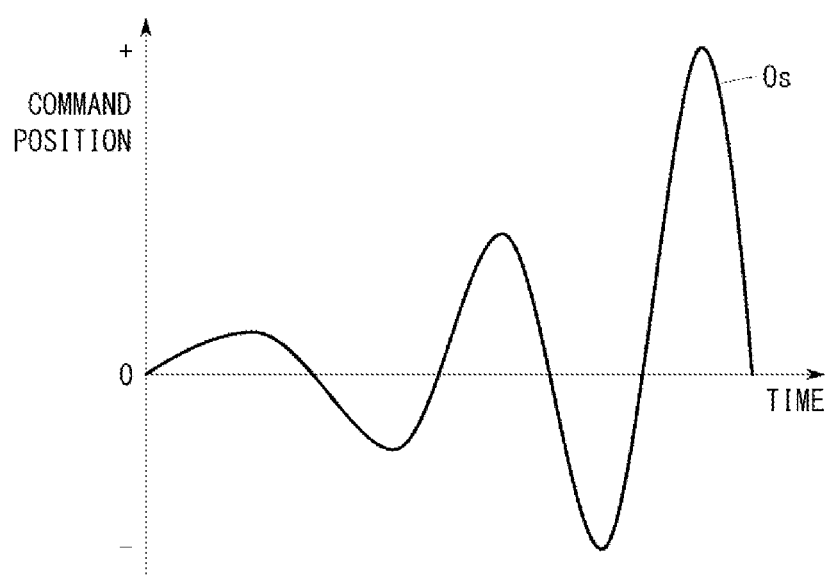
FIG. 2 is a diagram showing an example of an oscillating signal sent out by an oscillating signal sending unit shown in FIG. 1.

FIG. 2 is a diagram showing an example of the oscillating signal Os sent out from the oscillating signal sending unit 30. As shown in FIG. 2, the oscillating signal Os is a command signal that causes the rotary shaft of the servomotor 24 to rotate back and forth in a predetermined pattern. Since the oscillating signal Os sent to the motor control unit 20 is a command signal that gradually increases in amplitude and frequency with time, the swinging of the rotary shaft based on the oscillating signal Os also gradually increases in amplitude and frequency with passage of time. As the amplitude of the oscillation becomes greater, the rotation angle of the rotary shaft increases, and as the frequency of the oscillation increases, the rotational speed of the rotary shaft becomes faster.

The amplitude (rotational position, rotation angle) of rotation in the forward direction and the reverse direction from the reference position, that is, the amplitude of the swinging gradually increases with the passage of time. Also, the frequency of the swinging gradually increases with the passage of time. Even if an abnormality can be only detected with a specific amplitude and/or at a specific frequency, such an abnormality can be detected by varying the amplitude and frequency. As a result, it is possible to detect various abnormalities occurring in the drive system 10.

The value "0" of the oscillating signal Os indicates the reference position, the value of the oscillating signal Os with the (+) sign (plus sign) indicates the command position of the rotary shaft rotated in the forward direction from the reference position, the value of the oscillating signal Os with the (−) sign (negative sign) indicates the command position of the rotary shaft rotated in the reverse direction from the reference position. As the directive position becomes away from the reference position "0", the rotation angle of the rotary shaft from the reference position becomes greater. As this oscillating signal Os is supplied to the motor control unit 20, the motor control unit 20 rotates and swings the rotary shaft of the servomotor 24 according to the oscillating signal Os.

Figure 3:
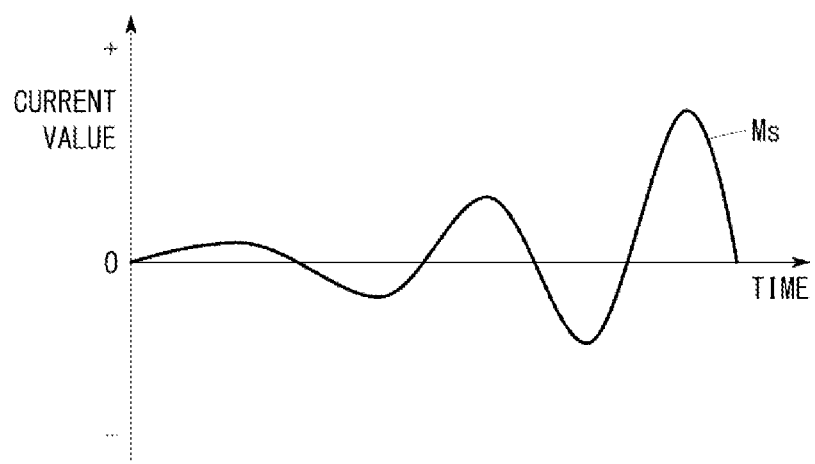
FIG. 3 is a diagram showing an example of a physical quantity measured by a measuring unit shown in FIG. 1.

The measuring unit 32 measures a physical quantity Ps representing the state of the servomotor when the rotary shaft of the servomotor 24 swings. As shown in FIG. 3, a measurement signal Ms indicating the physical quantity Ps measured by the measuring unit 32 periodically varies in accordance with the oscillating signal Os. The measuring unit 32 outputs the measurement signal Ms to the comparing unit 34.

Examples of the physical quantity Ps representing the state of the servomotor 24 include electric current flowing through the servomotor 24, and a torque, a rotational position, a speed, an acceleration and an inertia, of the rotary shaft of the servomotor 24. When measuring the current flowing in the servomotor 24, the measuring unit 32 may have a current sensor, and when measuring the torque of the rotary shaft of the servomotor 24, the measuring unit 32 may have a torque sensor. The measuring unit 32 may calculate the torque from the measured current value. Further, when measuring the rotational position of the rotary shaft of the servomotor 24, the measuring unit 32 may include an encoder for detecting the rotational position. The measuring unit 32 may calculate the speed and the acceleration from the rotational position. Further, the measuring unit 32 may calculate the inertia from the current value and the rotational position.

The measuring unit 32 may measure the torque, position, speed, acceleration or inertia of the driven object 28 as the physical quantity Ps. This is because the physical quantity Ps of the driven object 28 also represents the state of the servomotor 24. In short, the measuring unit 32 may measure the physical quantity Ps representing the state of the servomotor 24. The first embodiment will be described on the assumption that the measuring unit 32 measures the current flowing through the servomotor 24 as the physical quantity Ps.

Figure 4:
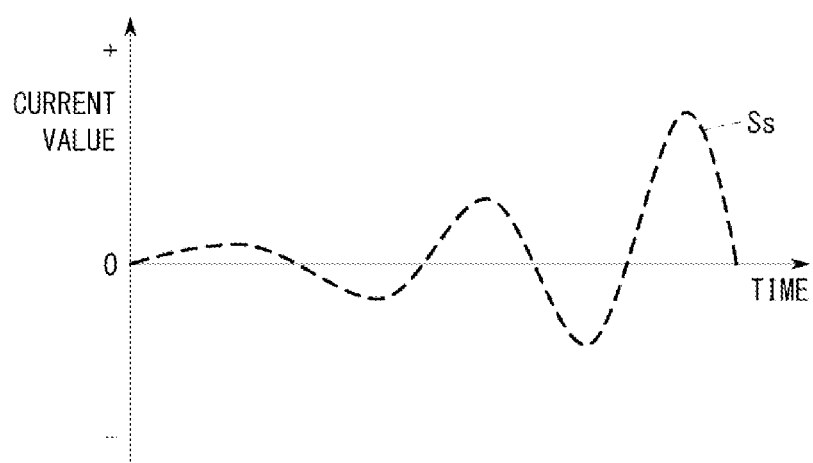
FIG. 4 is a diagram showing an example of a reference signal.

When a measurement signal (signal indicating the current value) Ms indicating the current (physical quantity) Ps flowing through the servomotor 24 is sent from the measuring unit 32 to the comparing unit 34, the comparing unit 34 compares the received measurement signal Ms with the reference signal Ss. The reference signal Ss is stored in a storage unit 34a of the comparing unit 34. As shown in FIG. 4, the reference signal Ss periodically varies in accordance with the oscillating signal Os.

The reference signal Ss may be a measurement signal Ms that is measured by the measuring unit 32 when the rotary shaft of the servomotor 24 is swung in accordance with the oscillating signal Os under the condition in which no abnormality is occurring in the drive system 10 (for example, at the time of assembling). Alternatively, the reference signal Ss may be a measurement signal Ms that was measured by the measuring unit 32 in the past or may be the average value thereof. The comparing unit 34 compares the measurement signal Ms with the reference signal Ss to calculate a difference D (absolute value) therebetween. The comparing unit 34 outputs the comparison result (difference D) to the abnormality determination unit 36. The comparing unit 34 will be specifically described later.

Upon receiving the comparison result from the comparing unit 34, the abnormality determination unit 36 determines if there is abnormality in the drive system 10 based on the sent comparison result. The abnormality determination unit 36 determines that the drive system 10 is abnormal when the difference D calculated by the comparing unit 34 is equal to or greater than a threshold TH, and determines that the drive system 10 is normal when the difference D is smaller than the threshold TH.

When there is no abnormality in the drive system 10, the measured measurement signal Ms and the reference signal Ss substantially completely coincide with each other or coincide with each other not completely but to an allowable level. However, there are cases where some abnormality in the drive system 10 occurs. For instance, due to loosening (abnormality) or the like of a bolt for supporting a member provided in the servomotor 24 or the drive power transmission mechanism 26 to generate or transmit the driving force, the load applied to the servomotor 24 may fluctuate. When the load on the servomotor 24 fluctuates, the detected measurement signal Ms deviates from that of normal operation. Further, when there is some abnormality in the servo-amplifier 22 or the motor control unit 20, it becomes impossible to control the servomotor 24 in accordance with the oscillating signal Os, so that the detected measurement signal Ms deviates from the measurement signal to be obtained in the normal state.

Therefore, when there is abnormality in the drive system 10, the difference D between the measurement signal Ms and the reference signal Ss falls outside an allowable range. Therefore, when the difference D between the measurement signal Ms and the reference signal Ss is equal to or greater than the threshold TH, the abnormality determination unit 36 determines that the drive system 10 is abnormal. Upon determining that the drive system 10 is abnormal, the abnormality determination unit 36 outputs an abnormality signal ER to the notifying unit 38.

When the abnormality signal ER is sent from the abnormality determination unit 36, the notifying unit 38 notifies the operator that the drive system 10 is abnormal. The notifying unit 38 may include a display device, so that when receiving the abnormality signal ER, the notifying unit can display on the display device the fact that the drive system 10 is abnormal to thereby give notice to the operator. Further, the notifying unit 38 may include a communication unit, so that when receiving the abnormality signal ER, the notifying unit can transmit the abnormality signal ER to another external device (for example, a PC, smartphone, etc.) via the communication unit so as to given notice to the operator. In this case, the operator recognizes the abnormality of the drive system 10 via the external device. In addition, the notifying unit 38 may be provided with a speaker. When receiving the abnormality signal ER, the notifying unit 38 may output an alarm sound (indicating that there is abnormality) from the speaker, thereby notifying the operator.

The measurement start control unit 40 manages the time to start measurement of the drive system 10. When the measurement start time has come, the measurement start control unit 40 transmits a measurement start signal ST to the oscillating signal sending unit 30 and the measuring unit 32. Upon receiving the measurement start signal ST, the oscillating signal sending unit 30 sends out the oscillating signal Os to the motor control unit 20. Upon receiving the measurement start signal, the measuring unit 32 measures the current Ps of the servomotor 24.

The measurement start control unit 40 may be configured to, when the operator operates an unillustrated input unit to thereby carry out the operation for starting abnormality determination, determine that the time has come to start the measurement and transmit the measurement start signal ST to the oscillating signal sending unit 30 and the measuring unit 32. Further, when abnormality determination is performed periodically, the measurement start control unit 40 may transmit the measurement start signal ST to the oscillating signal sending unit 30 and the measuring unit 32 when the measurement start time comes. In this case, the measurement start control unit 40 periodically transmits the measurement start signal ST to the oscillating signal sending unit 30 and the measuring unit 32.

Figure 5:
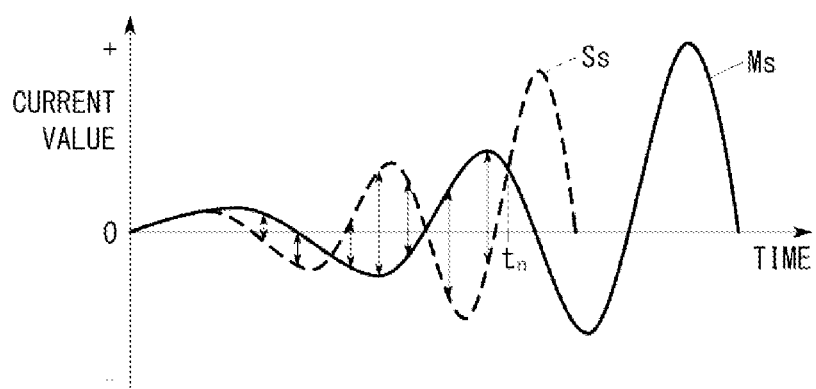
FIG. 5 is a diagram for explaining a first comparison method by a comparing unit shown in FIG. 1.
Figure 6:
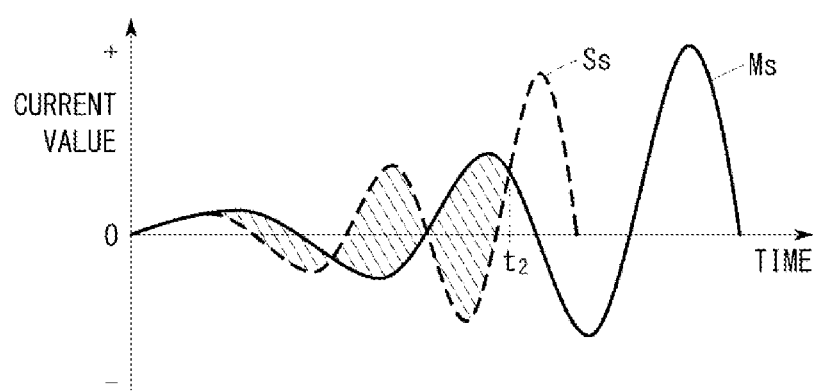
FIG. 6 is a diagram for explaining a second comparison method by a comparing unit shown in FIG. 1.
Figure 7:
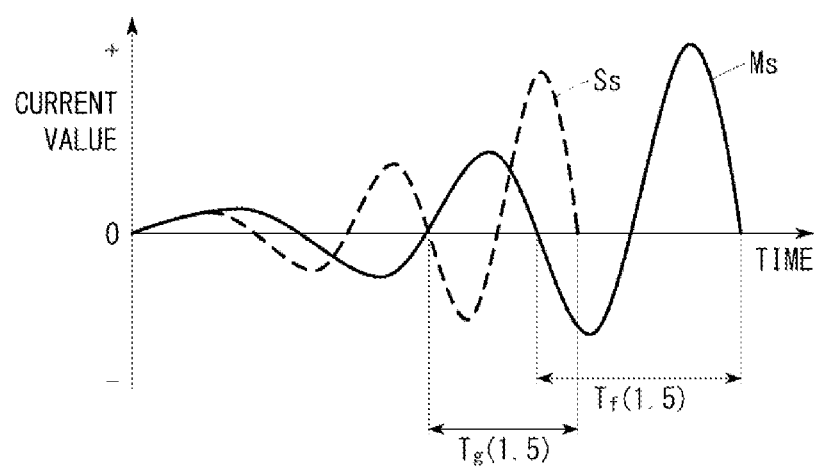
FIG. 7 is a diagram for explaining a third comparison method by a comparing unit shown in FIG. 1.
Figure 8:
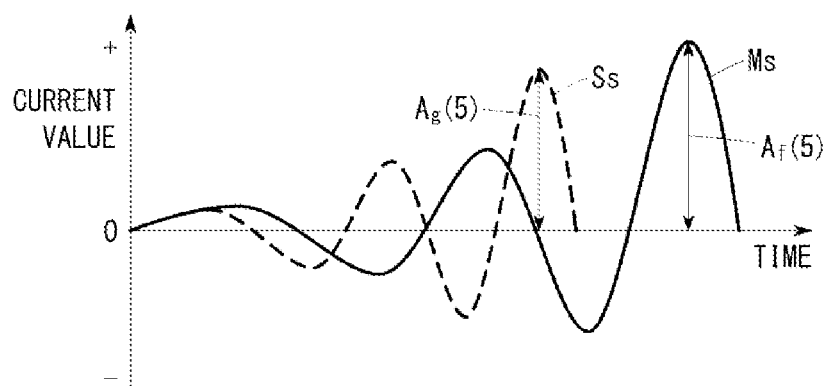
FIG. 8 is a diagram for explaining a fourth comparison method by a comparing unit shown in FIG. 1.

Next, the comparing unit 34 will be described in detail. In the first embodiment, four examples of the comparison method by the comparing unit 34 will be described below, but other methods may be used to perform comparison. FIG. 5 is a diagram for explaining a first comparison method, FIG. 6 is a diagram for explaining a second comparison method, FIG. 7 is a diagram for explaining a third comparison method, and FIG. 8 is a diagram for explaining a fourth comparison method. The waveforms shown by solid lines in FIGS. 5 to 8 represent the measured measurement signal Ms, and the waveforms indicated by broken lines represent the reference signal Ss.

<First Comparison Method>

To begin with, the first comparison method will be described. In the case of the first comparison method (see FIG. 5), the comparing unit 34 obtains a difference (absolute value) between the measurement signal Ms and the reference signal Ss at each of predetermined multiple points of time, and calculate a sum $D_1$ of the obtained differences. The predetermined multiple points of time may be points of time within a predetermined time interval. When the drive system 10 is free from abnormality, the sum $D_1$ of the differences (comparison result) takes a smaller value (e.g., 0) than the threshold value TH. Therefore, when the sum $D_1$ of the differences calculated by the comparing unit 34 is equal to or greater than the threshold TH, the abnormality determination unit 36 determines that the drive system 10 is abnormal. When the sum $D_1$ of the differences is smaller than the threshold TH, the drive system 10 is determined to be normal.

The comparing unit 34 calculates the sum (summation) $D_1$ of the differences at respective points of time within a time interval from time $t_m$ to time $t_n$ by using the following mathematical formula (1). Here, $f(t_i)$ represents the measurement signal Ms at time $t_i$, and $g(t_i)$ represents the reference signal Ss at time $t_i$, wherein i=m to n, m<n. In the example shown in FIG. 5, $t_m=0$.

$$D_1 = \Sigma_{i=m}^{n} |f(t_i) - g(t_i)| \qquad (1)$$

In the first comparison method, the points of time in a predetermined time interval are set at predetermined multiple points of times, but the multiple point of times do not need to be consecutive. The predetermined multiple points of times may be taken arbitrarily or at regular intervals.

The threshold TH in the first comparison method is determined depending on the oscillating signal Os and the predetermined multiple points of time. The reason is that since the amplitude and frequency of the oscillating signal Os sent to the motor control unit 20 gradually increase with passage of time as shown in FIG. 2, the longer the time length from the start of oscillation, the greater the difference between the measurement signal Ms and the reference signal Ss becomes, as shown in FIG. 5.

<Second Comparison Method>

In the case of the second comparison method (see FIG. 6), the comparing unit 34 calculates a value of integral $D_2$ of the difference (absolute value) between the measurement signal Ms and the reference signal Ss in a predetermined time interval. Also in this case, when the drive system 10 is free from abnormality, the value of integral $D_2$ of the difference takes a smaller value (e.g., 0) than the threshold value TH. Therefore, when the value of integral (comparison result) $D_2$ of the difference calculated by the comparing unit 34 is equal to or greater than the threshold TH, the abnormality determination unit 36 determines that there is abnormality in the drive system 10. When the value of integral $D_2$ of the difference is smaller than the threshold TH, the drive system 10 is determined to be normal.

The comparing unit 34 calculates the value of integral $D_2$ of the difference between the measurement signal Ms and the reference signal Ss in the time interval from time $t_1$ to time $t_2$ by using the following formula (2). Here, f(t) represents the measurement signal Ms at time t, and g(t) represents the reference signal Ss at time t, wherein $t_1 < t_2$. In the example shown in FIG. 6, $t_1 = 0$.

$$D_2 = \int_{t_1}^{t_2} |f(t) - g(t)| \qquad (2)$$

It should be noted that the threshold TH in the second comparison method is determined depending on the oscillating signal Os and the predetermined time interval (time $t_1$ to $t_2$). The reason is that since the amplitude and frequency of the oscillating signal Os sent to the motor control unit 20 gradually increase with passage of time as shown in FIG. 2, the longer the time length from the start of oscillation, the greater the difference between the measurement signal Ms and the reference signal Ss becomes, as shown in FIG. 6.

<Third Comparison Method>

In the case of the third comparison method (see FIG. 7), the comparing unit 34 compares the N-th period $T_f(N)$ of the measurement signal Ms with the N-th period $T_g(N)$ of the reference signal Ss to thereby calculate the difference therebetween (absolute value) $D_3$. In the example shown in FIG. 7, the comparing unit 34 compares the 1.5(=N)-th period $T_f(1.5)$ of the measurement signal Ms with the 1.5(=N)-th period $T_g(1.5)$ of the reference signal Ss. That is, the comparing unit 34 compares one period starting from a time point that is delayed a half cycle from the first period of the measurement signal Ms, with one period starting from a time point that is delayed a half cycle from the first period of the reference signal Ss. Also in this case, when the drive system 10 is free from abnormality, the period difference $D_3$ takes a smaller value (e.g., 0) than the threshold TH. Therefore, when the difference (comparison result) $D_3$ of one period calculated by the comparing unit 34 is equal to or greater than the threshold TH, the abnormality determination unit 36 determines that there is abnormality in the drive system 10, and if the difference $D_3$ of one period is smaller than the threshold TH, the drive system 10 is determined to be normal.

The comparing unit 34 calculates the difference $D_3$ between the N-th period $T_f(N)$ of the measurement signal Ms and the N-th period $T_g(N)$ of the reference signal Ss using mathematical formula (3) shown below.

$$D_3 = |T_f(N) - T_g(N)| \qquad (3)$$

It should be noted that the threshold TH in the third comparison method is determined depending on the oscillating signal Os and the value of N. The reason is that since the amplitude and frequency of the oscillating signal Os sent to the motor control unit 20 gradually increase with passage of time as shown in FIG. 2, the longer the time length from the start of oscillation, the shorter the periods of the measurement signal Ms and the reference signal Ss become as shown in FIG. 7.

<Fourth Comparison Method>

In the case of the fourth comparison method (see FIG. 8), the comparing unit 34 compares the N-th peak amplitude $A_f(N)$ of the measurement signal Ms with the N-th peak amplitude $A_g(N)$ of the reference signal Ss to thereby calculate a difference (absolute value) $D_4$ therebetween. FIG. 8 shows an example in which the comparing unit 34 compares the 5(=N)th peak amplitude $A_f(5)$ of the measurement signal Ms with the 5(=N)th peak amplitude $A_g(5)$ of the reference signal Ss. Also in this case, when the drive system 10 is free from abnormality, the amplitude difference $D_4$ takes a smaller value (e.g., 0) than the threshold TH. Therefore, when the amplitude difference (comparison result) $D_4$ calculated by the comparing unit 34 is equal to or greater than the threshold TH, the abnormality determination unit 36 determines that there is abnormality in the drive system 10, and if the amplitude difference $D_4$ is smaller than the threshold TH, the drive system 10 is determined to be normal.

The comparing unit 34 calculates the difference $D_4$ between the N-th amplitude $A_f(N)$ of the measurement signal Ms and the N-th amplitude $A_g(N)$ of the reference signal Ss using the following formula (4) shown below.

$$D_4 = |A_f(N) - A_g(N)| \qquad (4)$$

It should be noted that the threshold TH in the fourth comparison method is determined depending on the oscillating signal Os and the value of N. The reason is that since the amplitude and frequency of the oscillating signal Os sent to the motor control unit 20 gradually increase with passage of time as shown in FIG. 2, the longer the time length from the start of oscillation, the greater the amplitudes of the measurement signal Ms and the reference signal Ss become, as shown in FIG. 8.

Figure 9:
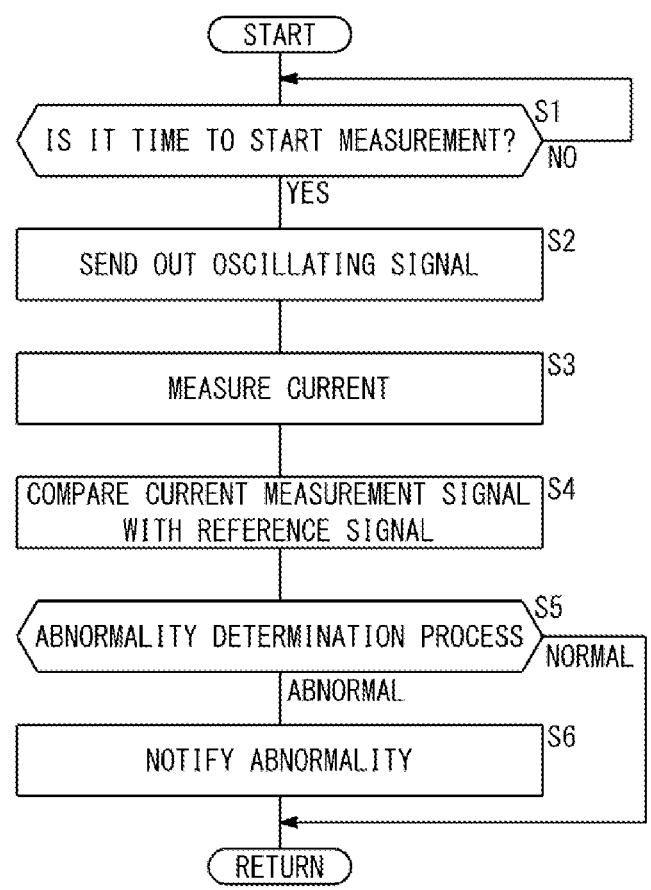
FIG. 9 is a flowchart showing the operation of an abnormality determination device according to the first embodiment.

Next, the operation of the abnormality determination device 12 will be briefly described with reference to FIG. 9. At step S1, the measurement start control unit 40 determines whether or not it is time to start the measurement. If it is determined at step S1 that the measurement start time has not come, the control returns to step S1. On the other hand, if it is determined at step S1 that the measurement start time has come, the control proceeds to step S2. At this time, when determining that it is time to start the measurement, the measurement start control unit 40 transmits the measurement start signal ST to the oscillating signal sending unit 30 and the measuring unit 32.

At step S2, the oscillating signal sending unit 30 sends the oscillating signal Os to the motor control unit 20 of the drive system 10. At step S3, the measuring unit 32 measures the current (physical quantity) Ps of the servomotor 24 of the drive system 10.

Next, the comparing unit 34 compares the measurement signal Ms of the current Ps measured at step S3 with the reference signal Ss stored in the storage unit 34a (step S4), and the abnormality determination unit 36, based on the comparison result, performs an abnormality determination process for determining whether or not the drive system 10 is abnormal (step S5). In step S4, the comparing unit 34 compares the measurement signal Ms and the reference signal Ss to thereby calculate the difference D therebetween (any one of $D_1$ to $D_4$), and in step S5, the abnormality determination unit 36 judges that an abnormality has occurred in the drive system 10 when the difference (comparison result) D is equal to or greater than the threshold TH.

If it is determined at step S5 that an abnormality has occurred in the drive system 10, the notifying unit 38 informs the operator of the fact of occurrence of the abnormality (step S6), and the control returns to step S1 (return). If it is determined at step S5 that no abnormality occurs in the drive system 10, the control directly returns to step S1 (return).

[Second Embodiment]

Next, a second embodiment will be described. In the first embodiment, the measurement signal Ms of the current (for physical quantity) Ps measured in the past in the drive system 10 to be examined for abnormality is used as the reference signal Ss. However, the second embodiment is different from the first embodiment in that the physical quantity (current) Ps measured in another or other drive systems 10 is used as the reference signal Ss.

Figure 10:
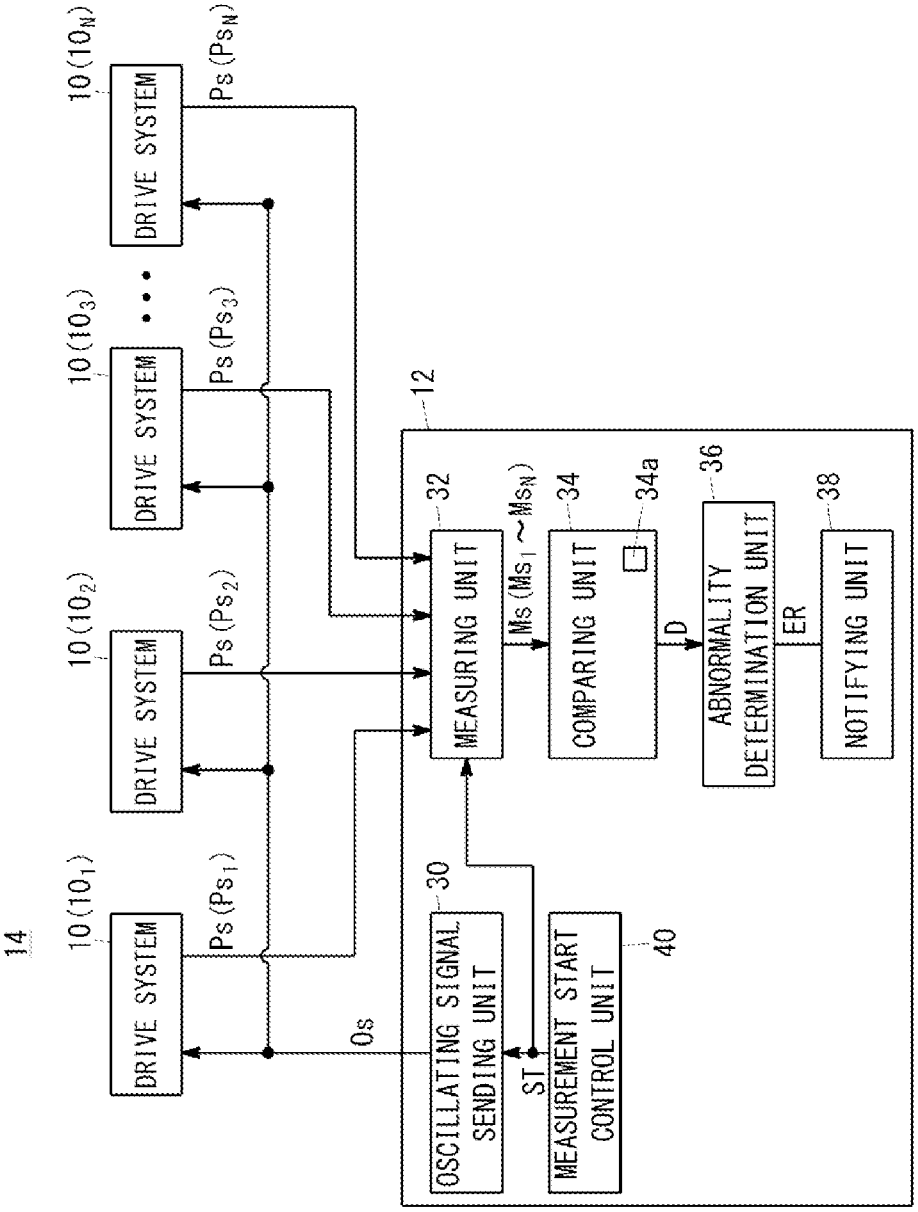
FIG. 10 is a diagram showing an abnormality determination system according to a second embodiment.

FIG. 10 is a diagram showing an abnormality determination system 14 according to the second embodiment. The same reference numerals are given to the same components as those in the first embodiment, and only different features will be described.

The abnormality determination device 12 determines abnormality of a plurality (N) of drive systems 10. The multiple drive systems 10 are drive systems used for the same purpose, and for example, used for multiple processing machines or robots of the same model. Specifically, the plural drive systems 10 may be drive systems that rotate or move the respective injection molding screws, or move the respective movable dies, in the injection molding machines of the same model. Here, in order to distinguish the multiple drive systems 10 from each other, the N drive systems 10 may be referred to as drive systems $10_1$ to $10_N$ in some cases. The oscillating signal sending unit 30 sends out the same oscillating signal Os to each of motor control units 20 of the multiple drive systems 10 ($10_1$ to $10_N$).

The measuring unit 32 measures a physical quantity (assumed as the current also in the second embodiment) Ps representing the state of the servomotor 24 when the rotary shaft of the servomotor 24 in each of the multiple drive systems 10 ($10_1$ to $10_N$) swings. That is, the current Ps flowing through the servomotor 24 of each drive system 10 is measured. The measuring unit 32 outputs the measurement signal Ms from each of drive systems 10 to the comparing unit 34. In this case, the currents Ps of the multiple drive systems $10_1$ to $10_N$ may be referred to as currents $Ps_1$ to $Ps_N$ in order to distinguish them from each other, and the measurement signals Ms may be referred to as $Ms_1$ to $Ms_N$.

The comparing unit 34 stores in the storage unit 34a the measurement signals Ms ($Ms_1$ to $Ms_N$) of the currents Ps ($Ps_1$ to $Ps_N$) in the respective drive systems 10 ($10_1$ to $10_N$) sent from the measuring unit 32. The comparing unit 34 selects one of the multiple drive systems 10 as the target of abnormality determination and uses at least one of the measurement signals Ms of the other unselected drive systems 10 as the reference signal Ss. Of the multiple measurement signals Ms ($Ms_1$ to $Ms_N$) stored in the storage unit 34a, the comparing unit 34 compares the measurement signal Ms of the selected drive system 10 with at least one of the measurement signals Ms (reference signal Ss) of the other unselected drive systems 10.

For example, when the comparing unit 34 selects the drive system $10_1$ as the target of abnormality determination, at least one of the measurement signals Ms of the currents Ps of the drive systems $10_2$ to $10_N$ is used as the reference signal Ss. Then, the comparing unit 34 compares the reference signal Ss with the measurement signal $Ms_1$ of the drive system $10_1$ selected as the target of abnormality determination. In this manner, the comparing unit 34 sequentially selects each of the multiple drive systems 10 as a target of abnormality determination, and compares the measurement signal Ms of the drive system 10 selected as the target of abnormality determination, with at least one of the measurement signals Ms (reference signal Ss) of the other drive systems 10 that are not selected as the target of abnormality determination.

When the measurement signals Ms of two or more drive systems 10 among the other multiple drive systems 10 that are not selected as the target of abnormality determination are used as the reference signal Ss, the average value of the multiple measurement signals Ms may also be set as the reference signal Ss. The average value of all the measurement signals Ms ($Ms_1$ to $Ms_N$) of the currents Ps ($Ps_1$ to $Ps_N$) of the drive systems 10 ($10_1$ to $10_N$) may also be used as the reference signal Ss, regardless of whether or not they are selected as the target of abnormality determination.

The comparing unit 34 calculates the difference D ($D_1$ to $D_4$) between the measurement signal Ms and the reference signal Ss by using any one of the four comparison methods described in the above first embodiment.

The abnormality determination unit 36 performs abnormality determination for each of the multiple drive systems based on the comparison result (difference D) from the comparing unit 34.

Next, referring to FIG. 11, the operation of the abnormality determination device 12 in the second embodiment will be described. At step S11, the measurement start control unit 40 determines whether or not it is time to start the measurement. If it is determined at step S11 that the measurement start time has not come, the control returns to step S11. On the other hand, if it is determined at step S11 that the measurement start time has come, the control proceeds to step S12. At this time, when determining that it is time to start the measurement, the measurement start control unit 40 transmits the measurement start signal ST to the oscillating signal sending unit 30 and the measuring unit 32.

At step S12, the oscillating signal sending unit 30 transmits the same oscillating signal Os to the motor control units 20 of the multiple drive systems 10 ($10_1$ to $10_N$), and at step S13, the measuring unit 32 measures the currents Ps ($Ps_1$ to $Ps_N$) of the servomotors 24 of the drive systems 10 ($10_1$ to $10_N$).

Next, at step S14 the comparing unit 34 stores in the storage unit 34a the measurement signals Ms ($Ms_1$ to $Ms_N$) of the currents Ps ($Ps_1$ to $Ps_N$) of the drive systems 10 ($10_1$ to $10_N$) measured by the measuring unit 32 at the step S13.

Next, at step S15 the comparing unit 34 selects one drive system 10 as a target of abnormality determination.

Next, at step S16 the comparing unit 34 compares the measurement signal Ms of the drive system 10 currently selected as the target of abnormality determination with one of the measurement signals Ms of the other drive systems 10 which are not currently selected as the target of abnormality determination. That is, one of the measurement signals Ms of the other drive systems 10 which are not currently selected as the target of abnormality determination serves as the reference signal Ss. When the measurement signals Ms of two or more drive systems 10 of the multiple drive systems 10 that are not currently selected as the target of abnormality determination are used as the reference signal Ss, the average value of the two or more measurement signals Ms may be set as the reference signal Ss. Note that the average value of the measurement signals Ms (Ms$_1$ to Ms$_N$) of all of the drive systems 10 (10$_1$ to 10$_N$) may be used as the reference signal Ss, regardless of whether or not they are selected as the target of abnormality determination.

Next, at step S17 the abnormality determination unit 36 determines whether there is abnormality in the currently selected drive system 10, based on the comparison result at step S16 (the difference D between the measurement signal Ms and the reference signal Ss). If the difference D (which may be any one of D$_1$ to D$_4$) calculated by the comparing unit 34 comparing the measurement signal Ms and the reference signal Ss is equal to or greater than the threshold TH, the abnormality determination unit 36 determines that there is abnormality in the currently selected drive system 10.

If it is determined at step S17 that an abnormality is occurring in the currently selected drive system 10, the notifying unit 38 informs the operator of the fact of occurrence of the abnormality (step S18) and the control proceeds to step S19. On the other hand, if it is determined at step S17 that no abnormality occurs in the currently selected drive system 10, the control directly goes to step S19.

At step S19, the comparing unit 34 determines whether there are any drive systems 10 that have not yet been selected as a target of abnormality determination. If it is determined at step S19 that there is any drive system 10 that has not yet been selected as a target of abnormality determination, the comparing unit 34 selects one of the drive systems 10 that have not been selected as a target of abnormality determination (step S20), then the control proceeds to step S16, and the above-described series of steps is repeated. On the other hand, if it is determined at step S19 that there is no drive system 10 that has not yet been selected as a target of abnormality determination, the control directly returns to step S11 (return).

Figure 11:
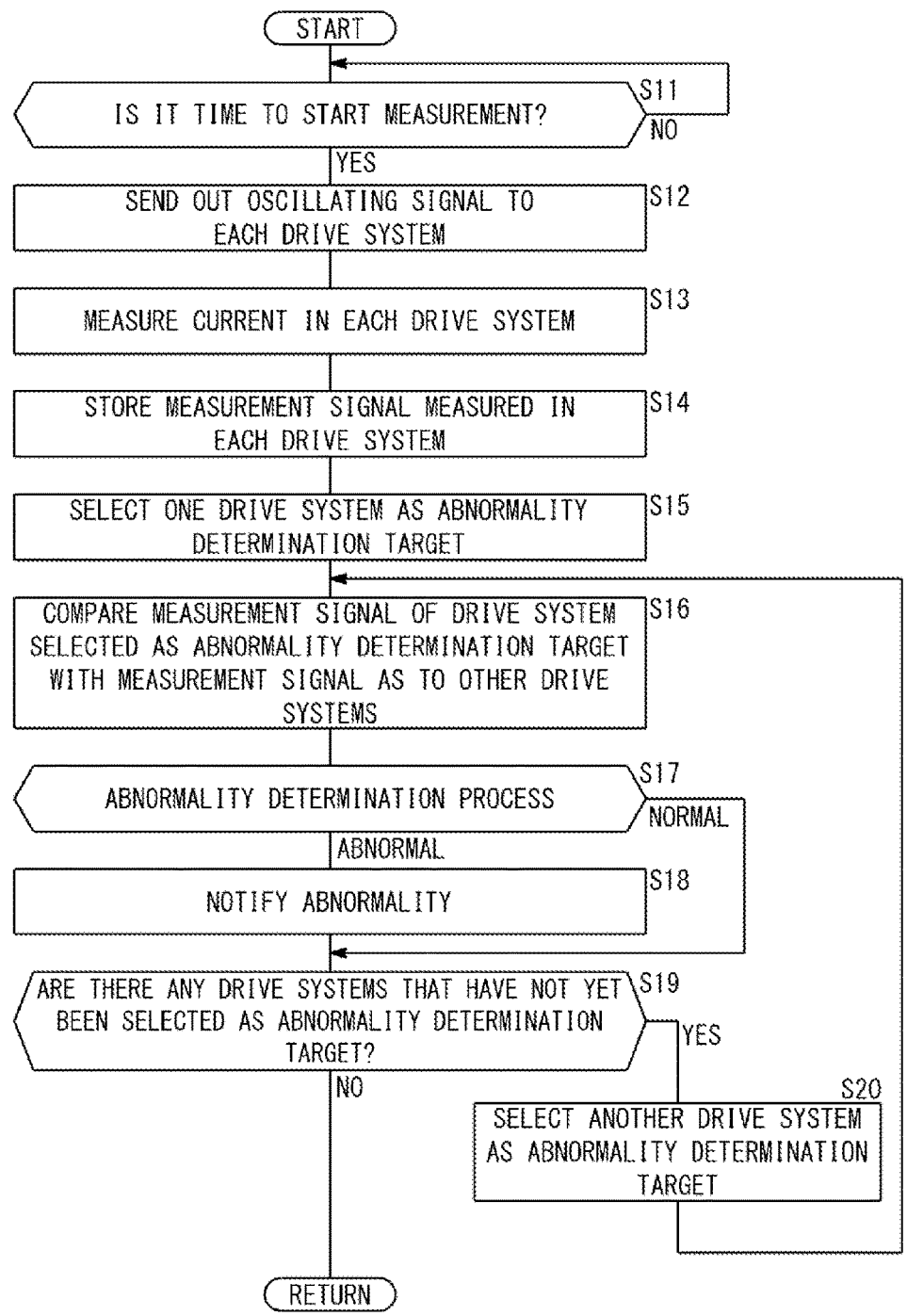
FIG. 11 is a flowchart showing the operation of the abnormality determination device according to the second embodiment.

In FIG. 11, the notifying unit 38 immediately gives notice when the drive system 10 selected as the target of abnormality determination turns out to be abnormal. However, the notifying unit 38 may notify the presence of abnormality in one or multiple drive systems 10 collectively after completing the abnormality determination on all the drive systems 10.

[Modifications]

The above embodiments may be modified as follows.
(Modification 1)

Figure 12:
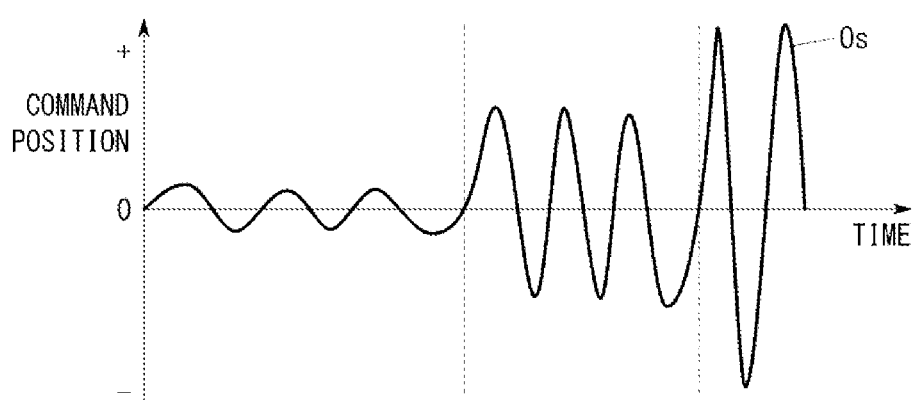
FIG. 12 is a diagram showing another example of an oscillating signal.

As shown in FIG. 12, the oscillating signal Os sent out to the motor control unit 20 may be a command signal that gradually increases in amplitude and frequency stepwise with the passage of time. Specifically, the oscillating signal Os may be a command signal whose amplitude and frequency increase stepwise at every predetermined number of cycles (at every 3 cycles in FIG. 12). As described above, since the amplitude and the frequency are gradually changed at every predetermined number of cycles, it is possible to more reliably detect abnormality of the parts constituting the drive system 10.

(Modification 2)

Although, in the above embodiments, the oscillating signal Os is specified to be a command signal whose amplitude and frequency gradually increase with the passage of time, the oscillating signal Os may be a command signal whose amplitude and frequency vary with the passage of time.
(Modification 3)

The oscillating signal Os may be a command signal in which either the amplitude or the frequency changes (for example, gradually increases) with the passage of time.
(Modification 4)

Though, in the above embodiments the amplitude and frequency of the oscillating signal Os are specified to change with the passage of time, the amplitude and frequency may be fixed. Since some abnormalities can be detected only at a certain specific frequency or amplitude, the amplitude and frequency of the oscillating signal Os may be changed every time abnormality determination is performed, that is, every time the sequence of operations in FIG. 9 or FIG. 11 is implemented.
(Modification 5)

The abnormality determination device 12 may be provided in a processing machine or robot having the drive system 10. In this case, the numerical control device provided in the processing machine or the robot for controlling the drive system 10 may be made to function as the abnormality determination device 12. In the case where a plurality of drive systems 10 are provided as in the second embodiment, the abnormality determination device 12 may be provided for each of multiple processing machines or robots including the multiple drive systems 10, or the abnormality determination device 12 may be provided for at least one of multiple processing machines or robots including the multiple drive systems 10.
(Modification 6)

The above Modifications 1 to 5 may be arbitrarily combined as long as no inconsistency occurs.

The abnormality determination device 12 thus described with the above embodiments and Modifications, includes: an oscillating signal sending unit 30 configured to send out an oscillating signal Os which causes a rotary shaft of a servomotor 24 to rotate and swing in a predetermined pattern, to a motor control unit 20 for controlling the servomotor 24; a measuring unit 32 configured to measure a physical quantity Ps representing the state of the servomotor 24 when the rotary shaft of the servomotor 24 is swung; a comparing unit 34 configured to compare a measurement signal Ms of the measured physical quantity Ps with a reference signal Ss; and an abnormality determination unit 36 configured to determine occurrence of an abnormality in a drive system 10 including the servomotor 24 and the motor control unit 20 and which ranges from a driven object 28 to be driven by the servomotor 24 to the motor control unit 20, based on the comparison result from the comparing unit 34.

In this manner, the physical quantity Ps representing the state of the servomotor 24 when the rotary shaft of the servomotor 24 is swung is measured, and the measurement signal Ms of the measured physical quantity Ps is compared with the reference signal Ss. Accordingly, it is possible to detect abnormalities in the drive system 10 inclusive of servomotor 24.

The reference signal Ss may be a periodically varying value corresponding to the oscillating signal Os. The comparing unit 34 may be configured to compare the measurement signal Ms with the reference signal Ss to thereby calculate a difference D therebetween. The abnormality determination unit 36 may determine that the drive system 10 is abnormal when the difference D is equal to or greater than a threshold TH. Thereby, it is possible to detect abnormality in the drive system 10 accurately.

The comparing unit 34 may calculate a sum $D_1$ of the differences at predetermined multiple points of time. The abnormality determination unit 36 may determine that the drive system 10 is abnormal when the sum $D_1$ of the differences is equal to or greater than the threshold TH. In this case, the threshold TH may be determined depending on the oscillating signal Os and the predetermined multiple points of time. Thereby, it is possible to detect abnormality accurately.

The comparing unit 34 may calculate a value of integral $D_2$ of the difference between the measurement signal Ms and the reference signal Ss in a predetermined time interval. The abnormality determination unit 36 may determine that the drive system 10 is abnormal when the value of integral $D_2$ of the difference is equal to or greater than the threshold TH. In this case, the threshold value TH may be determined depending on the oscillating signal Os and the predetermined time interval. As a result, abnormality can be accurately detected.

The comparing unit 34 may compare the N-th period $T_f(N)$ of the measurement signal Ms with the N-th period $T_g(N)$ of the reference signal Ss to thereby calculate a difference $D_3$ therebetween. The abnormality determination unit 36 may determine that the drive system 10 is abnormal when the difference $D_3$ is equal to or greater than the threshold TH. In this case, the threshold value TH may be determined depending on the oscillating signal Os and the value N. Thereby, it is possible to detect abnormality accurately.

The comparing unit 34 may compare the N-th amplitude $A_f(N)$ of the measurement signal Ms with the N-th amplitude $A_g(N)$ of the reference signal Ss to thereby calculate a difference $D_4$ therebetween. The abnormality determination unit 36 may determine that the drive system 10 is abnormal when the difference $D_4$ is equal to or greater than the threshold TH. In this case, the threshold value TH may be determined depending on the oscillating signal Os and the value N. Thus, it is possible to detect abnormality accurately.

The oscillating signal Os may be a command signal to cause the rotary shaft of the servomotor 24 to swing so that at least one of the amplitude and the frequency in the swinging gradually varies with the passage of time. Thus, it is possible to detect various abnormalities in the drive system 10.

The oscillating signal Os may be a command signal to cause the rotary shaft of the servomotor 24 to swing so that at least one of the amplitude and the frequency in the swinging gradually increases with the passage of time. If the rotary shaft of the servomotor 24 is swung by a large angle and at a high rotational speed at the beginning, there is a risk that parts of the drive system 10 may be damaged. The above feature makes it possible to prevent the parts from being damaged.

The reference signal Ss may be the measurement signal Ms of the physical quantity Ps that was measured in the past by the measuring unit 32 when the rotary shaft of the servomotor 24 was swung. Thereby, it is possible to detect abnormality precisely.

The abnormality determination device 12 may be provided in a processing machine or robot having the drive system 10. As a result, it is possible to clarify the abnormality location without disassembling the processing machine or the robot. In addition, the present invention can be easily utilized by using built-in controllers and display devices.

The oscillating signal sending unit 30 may send out the oscillating signal Os to each of the motor control units 20 of the multiple drive systems 10 used for the same purpose. The measuring unit 32 may measure the physical quantity Ps in each of the multiple drive systems 10. The comparing unit 34 may select one of the multiple drive systems 10 as a target of abnormality determination, use at least one of the measurement signals Ms of the physical quantity Ps of the other unselected drive systems 10 as the reference signal Ss, and compare the measurement signal Ms of the drive system 10 selected as the abnormality determination target with the reference signal Ss. Thus, it is possible to detect abnormality in the multiple drive systems 10.

The abnormality determination device 12 may be provided for at least one of a plurality of processing machines or robots of the same model having the multiple drive systems 10. This makes it possible to clearly locate abnormal parts without disassembling a plurality of processing machines or robots. In addition, the present invention can be easily utilized by using built-in control devices or display devices.

While the invention has been particularly shown and described with reference to preferred embodiments, it will be understood that variations and modifications can be effected thereto by those skilled in the art without departing from the scope of the invention as defined by the appended claims.

What is claimed is:

1. An abnormality determination device comprising:
an oscillating signal sending unit configured to send out an oscillating signal which causes a rotary shaft of a servomotor to rotate and swing in a predetermined pattern, to a motor control unit configured to control the servomotor;
a measuring unit configured to measure a physical quantity representing a state of the servomotor when the rotary shaft is swung;
a comparing unit configured to compare a measurement signal of the measured physical quantity with a reference signal that is configured to represent a periodically varying value corresponding to the oscillating signal, to thereby calculate a difference therebetween; and
an abnormality determination unit configured to determine an occurrence of an abnormality in a drive system based on a comparison result from the comparing unit,
wherein the abnormality determination unit is configured to determine that the drive system is abnormal when the difference is equal to or greater than a threshold.

2. The abnormality determination device according to claim 1, wherein:
the comparing unit is configured to calculate a sum of the differences at predetermined multiple points of time; and
the abnormality determination unit is configured to determine that the drive system is abnormal when the sum of the differences is equal to or greater than the threshold.

3. The abnormality determination device according to claim 1, wherein:
the comparing unit is configured to calculate a value of integral of the difference between the measurement signal and the reference signal in a predetermined time interval; and the abnormality determination unit is configured to determine that the drive system is abnormal when the value of integral of the difference is equal to or greater than the threshold.

4. The abnormality determination device according to claim 2, wherein the threshold value is determined depending on the oscillating signal and the predetermined multiple points of time.

5. The abnormality determination device according to claim 3, wherein the threshold value is determined depending on the oscillating signal and the predetermined time interval.

6. The abnormality determination device according to claim 1, wherein:
the comparing unit is configured to compare N-th period of the measurement signal with N-th period of the reference signal to thereby calculate a difference therebetween, wherein N is a fraction; and
the abnormality determination unit is configured to determine that the drive system is abnormal when the difference is equal to or greater than the threshold.

7. The abnormality determination device according to claim 1, wherein:
the comparing unit is configured to compare N-th amplitude of the measurement signal with N-th amplitude of the reference signal to thereby calculate a difference therebetween, wherein N is an integer; and
the abnormality determination unit is configured to determine that the drive system is abnormal when the difference is equal to or greater than the threshold.

8. The abnormality determination device according to claim 6, wherein the threshold value is determined depending on the oscillating signal and a value of N.

9. The abnormality determination device according to claim 7, wherein the threshold value is determined depending on the oscillating signal and a value of N.

10. The abnormality determination device according to claim 1, wherein the oscillating signal is a command signal to cause the rotary shaft to swing so that at least one of an amplitude and a frequency in the swinging gradually varies with passage of time.

11. The abnormality determination device according to claim 10, wherein the oscillating signal is a command signal to cause the rotary shaft to swing so that at least one of the amplitude and the frequency in the swinging gradually increases with passage of time.

12. The abnormality determination device according to claim 1, wherein the reference signal is the measurement signal of the physical quantity that was measured in times past by the measuring unit when the rotary shaft was swung.

13. The abnormality determination device according to claim 1, wherein the abnormality determination device is provided in a processing machine or a robot having the drive system.

14. The abnormality determination device according to claim 1, wherein:
the oscillating signal sending unit is configured to send out the oscillating signal to each of the motor control units of a plurality of the drive systems used for same purpose;
the measuring unit is configured to measure the physical quantity in each of the drive systems; and
the comparing unit is configured to select one of the drive systems as a target of abnormality determination, use at least one of the measurement signals of the physical quantity of the other unselected drive systems as the reference signal, and compare the measurement signal of the one drive system selected as the target of the abnormality determination with the reference signal.

15. The abnormality determination device according to claim 14, wherein the abnormality determination device is provided for at least one of a plurality of processing machines or robots of same model having the plurality of the drive systems.

16. An abnormality determining method, comprising:
a sending step of sending out an oscillating signal which causes a rotary shaft of a servomotor to rotate and swing in a predetermined pattern, to a motor control unit configured to control the servomotor;
a measuring step of measuring a physical quantity representing a state of the servomotor when the rotary shaft is swung;
a comparing step of comparing a measurement signal of the measured physical quantity with a reference signal that is configured to represent a periodically varying value corresponding to the oscillating signal, to thereby calculate a difference therebetween; and
a determining step of determining occurrence of an abnormality in a drive system based on a comparison result from the comparing step,
wherein in the determining step, it is determined that the drive system is abnormal when the difference is equal to or greater than a threshold.

* * * * *